Nov. 8, 1932.                J. B. VERNAY                1,887,471
                           FILTERING APPARATUS
                          Filed Jan. 3, 1930         3 Sheets-Sheet 1

Inventor.
Jean Baptiste Vernay
By [signature] Attorney

Nov. 8, 1932.   J. B. VERNAY   1,887,471
FILTERING APPARATUS
Filed Jan. 3, 1930   3 Sheets-Sheet 2
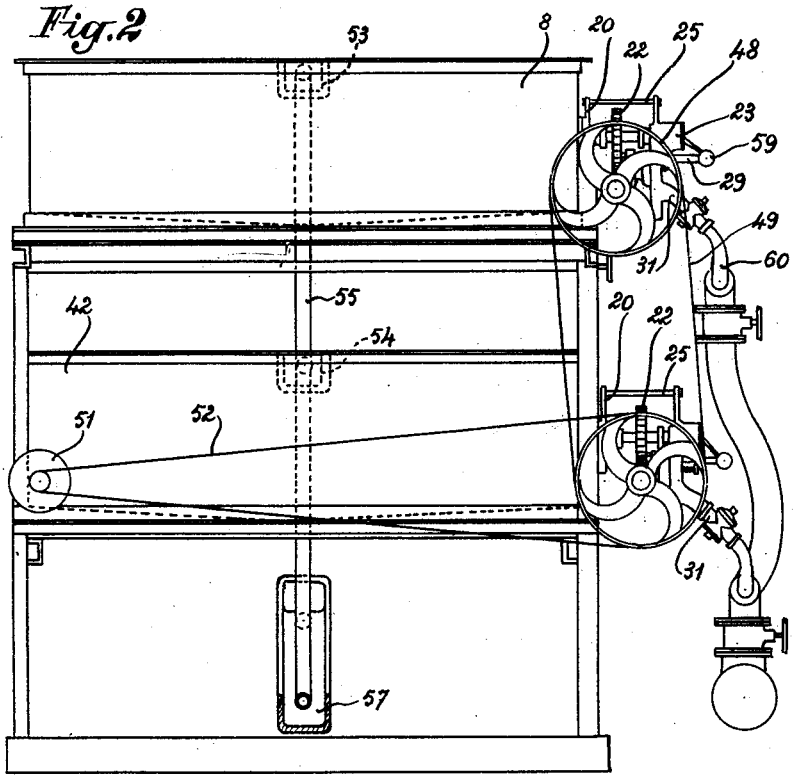
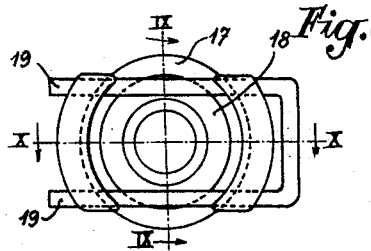
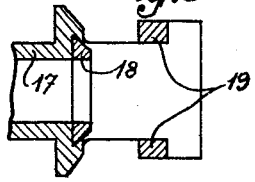
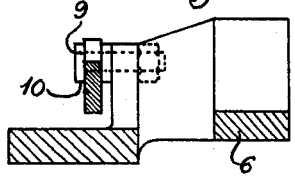
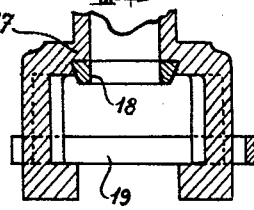
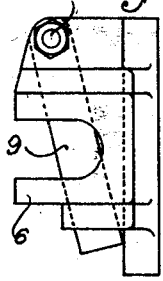
Inventor:
Jean Baptiste Vernay Nov. 8, 1932.  J. B. VERNAY  1,887,471
FILTERING APPARATUS
Filed Jan. 3, 1930  3 Sheets-Sheet 3

Inventor:
Jean Baptiste Vernay
By
Attorney.

Patented Nov. 8, 1932

1,887,471

UNITED STATES PATENT OFFICE

JEAN BAPTISTE VERNAY, OF VILLEURBANNE, FRANCE

FILTERING APPARATUS

Application filed January 3, 1930, Serial No. 418,287, and in France January 10, 1929.

My invention relates to a filtering apparatus which permits of removing clear liquid from a liquid containing solid matter in suspension. Such devices are particularly used in filtering plants, to make easier and quicker the work of the filter proper such as, for instance, a filtering drum.

Apparatus of this kind generally comprises a plurality of vertically arranged filtering cells, which are connected with a distributing gear. Each cell is successively submitted to suction (whereby clear liquid is drawn through the filtering medium) and to compressed air, or clear liquid under pressure (whereby the layer of solid matter on the filtering medium is removed).

My invention has for its object an apparatus of increased output, capable of saving place in the filtering plant, and economical in first cost.

This apparatus comprises essentially a filtering tank adapted to contain the mixture to be treated, with cylindrical filtering cells horizontally immersed therein all at the same level and adapted to rotate horizontally about their geometrical axes fixed with respect to the tank, and distributing means to connect said cells alternately with a low-pressure line and with a source of fluid under pressure. Further features of the invention are specifically pointed out in the appended claims.

In the annexed drawings:

Fig. 2 is a side view of the same.

Fig. 5 is a partial section on line V—V (Fig. 3).

Fig. 8 is an end view of the hollow shaft of a distributing gear.

Figs. 9 and 10 are sections on lines IX—IX and X—X (Fig. 8).

Fig. 11 is a plan view of the end bearing of a cell.

Fig. 12 is an end view of the same.

Fig. 13 is a section on line XIII—XIII of Fig. 11.

Figure 1:
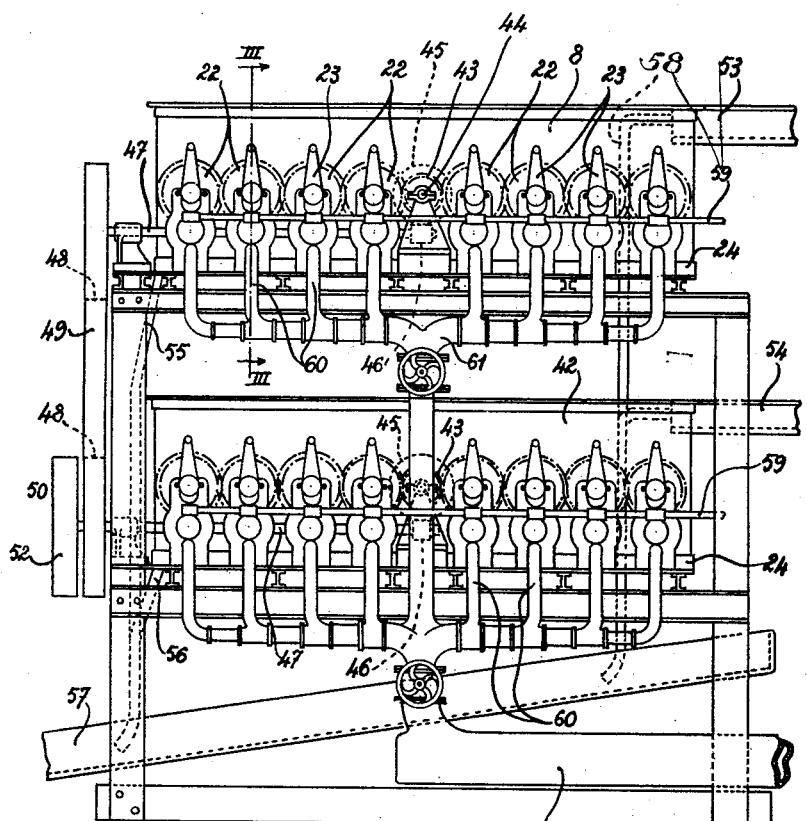
Fig. 1 is a front view of an apparatus provided with two sets of eight cells.

Each cell (Fig. 3) is a substantially cylindrical box 1 with a perforated side wall. It will be observed that in Fig. 3 the length of the cell has been considerably reduced to save space in the drawings. A filtering cloth 2 is wrapped around the cell and maintained by a winding 3 of wire or the like.

The cell is closed by two end covers. Cover 4 is integral with a trunnion 5 which is supported by a bearing 6 fixed onto an angle iron 7 supported by the tank 8.

This bearing is provided with a movable thrust-supporting member 9. As shown (Figs. 11 to 13) this member 9 is pivoted at 10 and its free end is normally engaged into a slit 11.

A cylindro-conical member 12 is integral with cover 4. This member extends within the cell so as to reduce as much as possible the internal capacity thereof. Spacers 13 are provided between the periphery of member 12 and the side wall of the cell so that member 12 cooperates to the rigidity of the whole.

The front cover 14 of the cell is slightly conical in shape and is integral with a hollow shaft 15 which is provided at its free end with a hollow frustro-conical enlargement 16.

The individual driving gear embodies a hollow shaft 17 which terminates, within tank 8, into a bifurcated member as clearly shown in Figs. 8 to 10. This member is adapted to receive shaft 15 the end 16 of which abuts against a packing 18 which thus tightly connects the axial bores of shafts 15 and 17.

Figure 3:
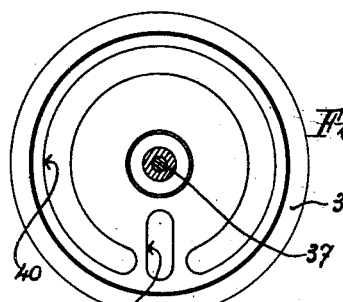
Fig. 3 is an enlarged section on line III—III of Fig. 1.

A U-shaped key 19 is then inserted transversely as shown and this key is arranged to contact with the rear edge of part 16 so as to maintain the latter pressed against packing 18 (Fig. 3).

Shaft 17 is rotatably supported by a plate 20 fixed to tank 8 and provided with a stuffing box 21. A gear-wheel 22 is keyed on said shaft to drive the same.

Figure 4:
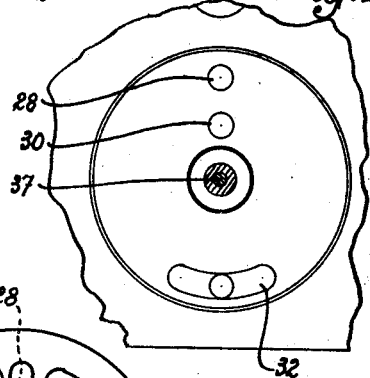
Fig. 4 is a partial section on line IV—IV (Fig. 3).

The distributing gear proper comprises a member 23 fixed at a small distance from tank 8 by means of a U beam 24 and of a stay 25. Shaft 17 penetrates into member 23 through a stuffing box 26 and its axial bore is thus connected with a canal 27 which opens at 28. Member 23 also comprises a compressed-air canal 29 which opens at 30 just below opening 28, and a suction canal 31 opening well below the formers, into an arcuate depression 32. Figs. 3 and 4 clearly show the arrangement of openings 28, 30 and depression 32.

These openings cooperate with a rotating slide 33 driven by a toothed wheel 34 which cooperates with a pin 36 laterally provided on wheel 22. Slide 33 is supported by a shaft 37 provided with a head 38. A spring 39 is provided on shaft 37 so as to press slide 33 against member 23.

Figures 6, 7:
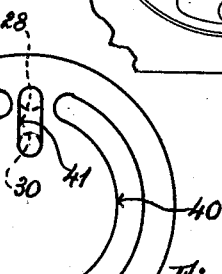
Figs. 6 and 7 are diagrams to show the operation of the distributing gear.
Figure 3:
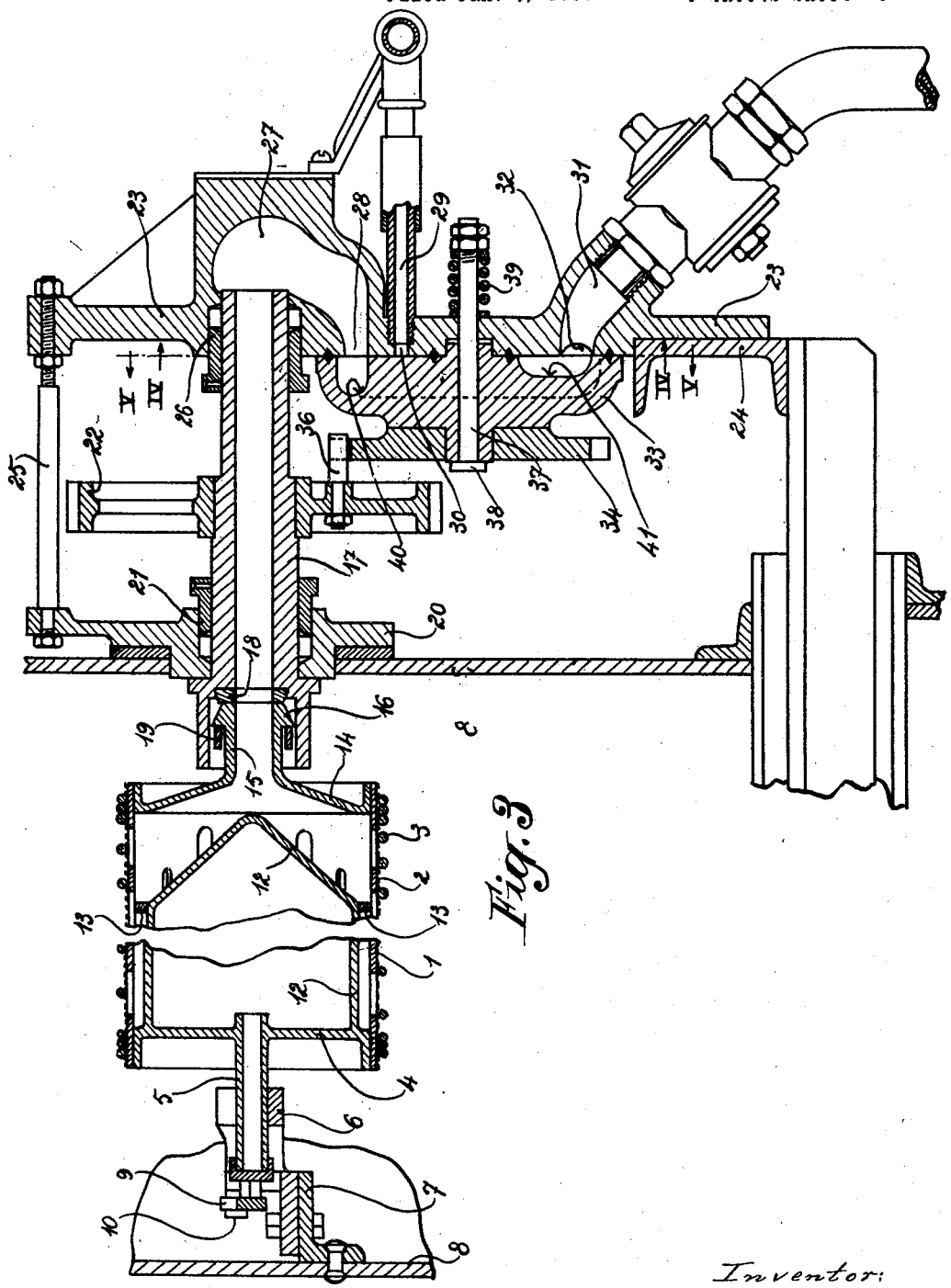

The operative face of slide 33 (Fig. 5) is provided with a circular depression 40 which extends through slightly less than 360°, and with a radially elongated depression 41 located between the ends of depression 40. Depression 40 is arranged to cooperate with opening 28 and depression 32 of member 23, and depression 41 is adapted to connect openings 28 and 30 with each other (Figs. 6 and 7).

The apparatus (Figs. 1 and 2) comprises two superimposed tanks 8 and 42, each one being provided with eight cells having their axes in the same horizontal plane. As shown, the wheels 22 of the four right or left cells are in mutual successive engagement and a central gear wheel 43 is arranged between the two groups so as to mesh with the wheel of the first cell of each group. This wheel 43 is keyed on a shaft 44 provided with a worm-wheel 45 driven by a screw 46 keyed on a transverse shaft 47, provided with a pulley 48, both pulleys 48 being connected by a common belt 49. The lower shaft 47 is also provided with another pulley 50 which is driven by a motor 51 through a belt 52.

The liquid to be treated is fed at 53 and 54 into tanks 8 and 42 and the thickened liquid flows through pipes 55 and 56 into an inclined canal 57. An overflow pipe 58 is also provided.

The compressed-air canals 29 of the cells of a tank are connected with a common line 59 (Figs. 1, 2 and 3). The individual suction canals 31 are connected through pipes 60 and 61, with a common suction line 62.

The operation is as follows:

Shafts 47 are driven by motor 51, and they drive wheels 43. Wheels 22 are thus rotated and they drive the cells.

Each wheel 22 (Fig. 3) also drives the respective slide 33 by means of pin 36. Slide 33 thus receives a jerking motion. When opening 28 (Figs. 4 to 7) registers with depression 40, the cell is connected with the suction line 31. Owing to depression 32 in member 23, this connection is not interrupted when the inlet of the suction canal registers with depression 41 in slide 33. When opening 28 registers with depression 41, the cell is connected with the compressed air line 29. Owing to the jerking motion of slide 33, no time is lost to pass from suction to compressed air and vice-versa, although the average angular speed of slide 33 is very slow.

The distributing gears of the cells of a set are preferably disposed in such a way that the cells are submitted to compressed air in succession. Thus, the output of the set is not seriously impaired by the mud-removing periods. When a great number of cells is dealt with, they may be submitted to compressed air by groups.

The operation is thus substantially similar to that of the known apparatus of this kind. But it has been noted that, owing to the rotation of the cells, the output was considerably increased. The horizontal position of the axis of the cell is also of importance for a good operation.

When it is desired to remove a cell for repair or any other purpose, key 19 is removed, thrust member 9 is rotated so as to free trunnion 5. The cell is pulled backward (i. e. to the left of Fig. 3) and when the end 16 of shaft 15 is out of the bifurcated end of shaft 17, the cell is entirely free and can be removed at will. By providing valves in the compressed air and suction lines of the cell, this operation does not interfere with the working of the set.

The inner member 12 (Fig. 3) has for its object to reduce the internal capacity of the cell. When compressed air is applied to the cell, the liquid present within canal 27, shafts 17 and 15 and the cell, is rejected into the tank. This is detrimental to the output of the apparatus. Member 12 substantially reduces the capacity of the cell and thus minimizes this inconvenience.

The filtering medium employed may be a hollow cylindrical filtering stone without departing from my invention. Also in lieu of compressed air, clear filtered liquid under pressure can be used.

I claim:

1. An undivided thickening filter apparatus comprising in combination a tank adapted to contain the mixture to be treated, cylindrical filtering cells horizontally disposed therein all at the same level, and adapted to rotate horizontally about their geometrical axes fixed with respect to the tank, means to rotate each individual cell about its own axis, an individual distributing gear to each cell adapted to connect the corresponding cell alternately with a low pressure line and with a source of fluid under pressure, and transmission means between each cell and its distributing gear whereby the rotation of each cell is intermittently transmitted to its distributing gear.

2. A filtering apparatus comprising a tank adapted to contain the mixture to be treated;

a plurality of rotating filtering cells disposed therein, said cells having their axes substantially horizontal; a hollow driving shaft for each cell; means to tightly connect said cell with said shaft; an individual distributing gear for each cell adapted to connect the same alternately with a low-pressure line and with a source of fluid under pressure, said distributing gear being connected with said cell through the axial bore of said shaft; a toothed wheel keyed on said shaft, the wheels of a number of cells meshing together; means to rotate one wheel of each group of wheels meshing together; and means whereby each wheel drives the corresponding distributing gear.

3. A filtering apparatus comprising a tank adapted to contain the mixture to be treated; rotating filtering cells disposed therein; means to rotate each individual cell about its axis; an individual distributing gear comprising a body having a flat surface; a first canal connected with the cell and opening through said flat surface; a second canal connected with a source of fluid under pressure and opening through said flat surface; a third canal connected with a low-pressure line and opening through said flat surface; a rotatable slide in contact with said flat surface; means to rotate said slide; and means whereby said slide, during its rotation connects said first-named opening alternately with said second-named and with said third-named openings.

4. A filtering apparatus comprising a tank adapted to contain the mixture to be treated; rotating filtering cells disposed therein; means to rotate said cells; distributing gear adapted to connect said cells alternately with a low-pressure line and with a source of fluid under pressure; means to removably connect a cell with said distributing gear comprising a hollow trunnion fixed to the cell, the axial bore of said trunnion being connected with the internal space of the cell and said trunnion terminating into an annular enlargement; a hollow shaft connected with the distributing gear, said shaft terminating in a bifurcated member adapted to receive said trunnion, said bifurcated member having transversal grooves; and a U-shaped key adapted to be inserted into said grooves so that both legs thereof contact with said annular enlargement, whereby the end of said trunnion is maintained in contact with the end of said shaft.

In testimony thereof I affix my signature.

JEAN BAPTISTE VERNAY.